Patented Aug. 27, 1935

2,012,301

UNITED STATES PATENT OFFICE 2,012,301

HALOGENATED POLYPHENYL KETONE

Frank M. Clark and Walter M. Kutz, Pittsfield, Mass., assignors to General Electric Company, a corporation of New York No Drawing. Application April 4, 1933, Serial No. 664,360

12 Claims. (Cl. 260—64)

As a consequence of our present invention we have produced new halogenated hydrocarbon compositions which are suited for various industrial uses and in particular for dielectric purposes, as heat-interchange media or as lubricants either alone or mixed with other materials such as oil.

Mineral hydrocarbon oil, which has long been used as dielectric material in electrical apparatus, possesses many disadvantages. For example, it is inflammable and forms explosive gases when subjected to an electric arc. It also forms semisolid products commonly termed sludge, which lower the efficiency of the dielectric medium. Furthermore, as the oil is lighter than water any water present in the dielectric will eventually collect at the bottom of the apparatus where it may cause trouble.

Other liquids such for example as various noninflammable halogenated hydrocarbons, have been proposed as substitutes for the oil. A disadvantage accompanying the use of halogenated hydrocarbons in connection with switches is the formation of carbon by contact of an electric arc therewith. This finely divided carbon is dispersed throughout such dielectric medium and hastens electrical breakdown.

The new compositions constituting our invention may be considered as a new form of halogenated polyphenyl ketone. While such compounds in a broad sense all may be considered as phenyl groups linked to one another by a ketone group (CO) the phenyl groups containing chlorine, or other halogen, replacing hydrogen to an extent varying in different compounds, such compounds occur in different forms having distinct physical properties.

When chlorinated diphenyl ketones having a chlorine content higher than possessed by a monochlor compound were prepared by methods heretofore known, they were found to be crystalline bodies melting at a temperature of 46° C. or higher. Such crystalline compounds are not suitable for dielectric purposes.

Halogenated diphenyl ketone products prepared in accordance with our invention are non-crystalline, or resinous in nature, when occurring as solids, and in some forms are liquid at room temperatures. They possess physical, chemical and electrical properties making them particularly well adapted for dielectric and cooling uses in various forms of electric devices.

They are stable compounds and as a result do not corrode the metallic parts of electrical apparatus. They exhibit a greatly decreased carbon separation when subjected to electric arcs. Because of their high boiling points and consequent low volatility there is practically no loss of the dielectric material in unsealed devices due to evaporation. They are free from sludge formation and, as they have a specific gravity greater than water, any water present in the dielectric will eventually collect at the top of the apparatus from where it may evaporate without causing trouble. They are also well adapted for use as admixtures with other dielectric materials.

The present invention comprises also a new process of preparing halogenated diphenyl ketone involving the use of iron, or iron chloride, as a catalyst.

Although our invention is concerned with a liquid form of halogenated diphenyl ketone we shall describe first the preparation of diphenyl ketone (benzophenone) as the raw material for use in connection with our new halogenation method.

A mixture of approximately one mol. of benzene and 2 mols. of carbon tetrachloride is allowed to react in the presence of about ½ mol. of aluminum chloride for two or three hours at a temperature of 10 to 15° C. The reaction mixture consists mainly at the end of this period of diphenyl dichlor methane and together with some unreacted benzene and carbon tetrachloride. The chlorine atoms then are hydrolyzed, hydrochloric acid being liberated, and the ketone group compound is formed. The mixture then is fractionally distilled and a solid composed chiefly of diphenyl ketone is obtained. This solid melts at about 47 to 48° C. and boils at about 187 to 190° C. under 15 m. m. Hg. This product may be halogenated as hereinafter described.

Halogenated diphenyl ketone derivatives may be prepared by condensing halogenated benzene with carbon tetrachlor in a manner similar to the preparation of diphenyl ketone.

Diphenyl ketone or halogenated diphenyl ketone may be prepared by reacting benzoyl chloride or halogenated benzoyl chloride with benzene or halogenated benzene in the presence of aluminum chloride.

The products obtained by direct chlorination of diphenyl ketone in the presence of the various catalysts are not chemically pure. The halogenated compositions embodying our invention while corresponding mainly to a certain definite chlorine content, such for example as the pentachlor diphenyl ketone, contain mixtures of the various isomers and small amounts of compounds containing lower or higher chlorine content.

When diphenyl ketone is chlorinated at about 150 to 160° C. in the presence of iron, or iron chloride, the products formed are varied in nature. The dichlor-diphenyl ketone thus formed is a liquid product with a boiling point of 235 to 250° C. at 25 mm. pressure and a specific gravity at 100° C. of 1.21 (referred to water at 15.5° C.). The liquid may contain suspended crystals which may be removed. With the increase in chlorine content the boiling points and the specific gravities of the products increase but the product is still a liquid.

For example, pentachlor-diphenyl ketone prepared in accordance with the present process employing iron chloride (or iron which becomes converted to the chloride during the reaction) as the catalyst is a liquid product having a pour point of plus 15° C. This product shows no tendency towards crystallization. It has a boiling point of 250 to 280° C. at 25 mm. pressure, a specific gravity at 100° C. of 1.43 (referred to water at 15.5° C.) and a viscosity at 100° C. of 54 seconds Saybolt universal.

The hexachlor-diphenyl ketone prepared by chlorinating diphenyl ketone in the presence of iron or iron chloride is a viscous liquid at 21° C., while at lower temperatures it is a plastic solid. This product which is essentially hexachlor-diphenyl ketone has a boiling point of about 275 to 310° C. at 25 mm. pressure, a specific gravity at 100° C. of 1.48 (referred to water at 15.5° C.) and a viscosity at 100° C. of 61 seconds Saybolt universal. It may be used in high tension bushings.

Pentachlor-diphenyl ketone which has a balance between the hydrogen and halogen, that is, the same number of hydrogen and halogen atoms within the molecule or mixture, not only is non-inflammable but the gases formed by contact of an electric arc therewith are non-explosive. This product has an extremely high dielectric constant, the value tested at 1000 cycles being 7.54 at 25° C. and 8.2 at 50° C. These values are approximately 3½ times that of mineral oil whose dielectric constant is ordinarily about 2.2. This product can be used advantageously for dielectric material for capacitors where a high dielectric constant is desired.

In mineral oils and halogenated hydrocarbons heretofore used as a dielectric in an electrical device in which arcs are formed, such for example as a high voltage switch, a quantity of finely divided carbon is produced by the arcing and is dispersed throughout the dielectric medium. This finely divided carbon, which is a conductor of electricity, does not settle out rapidly, and as has been previously mentioned, its presence causes a great loss in efficiency of the dielectric properties of the insulative material.

A switch containing a dielectric comprising chlorinated diphenyl ketone preferably admixed with trichlor-benzene when subjected to an arc is substantially free as above described from the formation of large carbon deposits. This decrease in the carbon deposit is directly due to the presence of oxygen in the molecule of the dielectric which forms carbon monoxide under the stress of the arc. While the carbon monoxide is in itself an inflammable and explosive gas the mixture of gases formed by an arc in contact with a dielectric containing the hydrogen-halogen balance is non-explosive. For example, when pentachlor-diphenyl ketone is subjected to an electric arc approximately ninety per cent of the gases liberated are made up of non-inflammable hydrogen chloride. The presence of this large amount of hydrogen chloride gas is sufficient to snuff the arc and make the mixture of gases non-explosive.

While our invention has been described with particular reference to the use in electrical devices of a dielectric consisting essentially of a particular chlorinated diphenyl ketone, we may employ to advantage mixtures of the various chlorinated diphenyl ketones. Mixtures of the under-chlorinated products (products containing less chlorine than hydrogen) may be mixed with over-chlorinated products (products containing more halogen than hydrogen) in order to obtain a mixture with the hydrogen-halogen balance. Mixtures of this type, as has been pointed out, are not only non-inflammable but the gases formed by an electric arc are non-explosive. They may be employed as cooling and insulating liquids in transformers, cables and the like.

Dielectric mixtures comprising halogenated diphenyl ketone with other halogenated compounds are meant to be included and come within the scope of our invention.

Mixtures of halogenated polyphenyls, such as chlorinated diphenyl ketone and various mineral or vegetable oils, have been described and claimed in a copending Clark application Serial No. 656,142, filed February 10, 1933.

When a composition of low viscosity and low pour point is desired, various forms of halogenated diphenyl ketone may be compounded with trichlorbenzene in various proportions, particularly when a dielectric medium is desired which is intended to remain liquid at low outdoor temperatures. For example, a liquid mixture of isomers of trichlorbenzene as described in United States Patent No. 1,944,730, issued on January 23, 1934 may be admixed with equal parts by weight of the liquid pentachlor-diphenyl ketone above described. Other proportions may be used.

In some cases a liquid composition suitable for use as a dielectric and cooling medium may be prepared by compounding solid forms of halogenated diphenyl ketone as heretofore known with trichlor-benzene is various proportions.

It will be understood by those skilled in the art that other halogens, such for example as iodine, bromine, and fluorine may be substituted for the chlorine in the chlorinated diphenyl ketone without departing from the spirit of our invention. It will also be understood by those skilled in the art that various substituted halogenated polyphenyl ketones come within the scope of our invention.

In our copending application Serial No. 664,361 filed concurrently herewith we have described other forms of halogenated phenyl derivatives of alkyl groups, such as derivatives of methane and ethane and have made claims generic to the invention which is herein claimed.

What we claim as new and desire to secure by Letters Patent of the United States, is:

1. A non-crystalline halogenated aromatic ketone.

2. In a composition of matter a non-crystalline halogenated diphenyl ketone.

3. A liquid chlorinated diphenyl ketone, which is non-crystalline when solidified.

4. A liquid chlorinated diphenyl ketone containing equal molecular proportions of chlorine and hydrogen.

5. A liquid chlorinated diphenyl ketone having a dielectric constant of 8.2 at 50° C. and at a frequency of 1000 cycles.

6. The process of producing liquid chlorinated diphenyl ketones which comprises chlorinating diphenyl ketone in the presence of an iron catalyst.

7. The process of producing plastic, non-crystalline chlorinated diphenyl ketone which comprises chlorinating diphenyl ketone in the presence of an iron catalyst.

8. A chlorinated diphenyl ketone having a pour point of 21° C. and a chlorine content of about 57 per cent by weight.

9. A chlorinated diphenyl ketone having a pour point of 15° C. and a chlorine content of about 52 per cent by weight.

10. A dielectric composition comprising essentially a halogenated diphenyl ketone which is liquid at temperatures as low as 21° C.

11. A composition consisting of a range of liquid chlorinated diphenyl ketone products having boiling points varying between 235° C. to 310° C. at 25 m. m. pressure, having specific gravities varying from 1.21 to 1.48 at 100° C. (referred to water at 15.5° C.) and varying in composition from the dichlor to the hexachlor compound.

12. Compositions of matter comprising essentially a range of compounds in which phenyl groups are linked to one another by a ketone group, the phenyl groups containing chlorine, said compounds being non-inflammable, non-crystalline, and having physical, chemical and electrical properties adapting such compounds for dielectric uses in electrical apparatus.

FRANK M. CLARK.
WALTER M. KUTZ.